Figure 1:
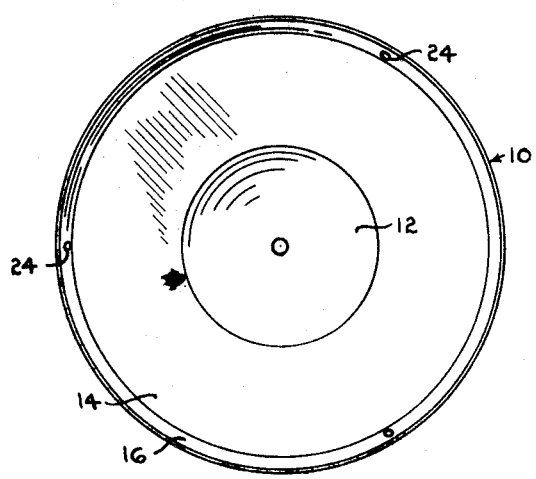
Figure 3:
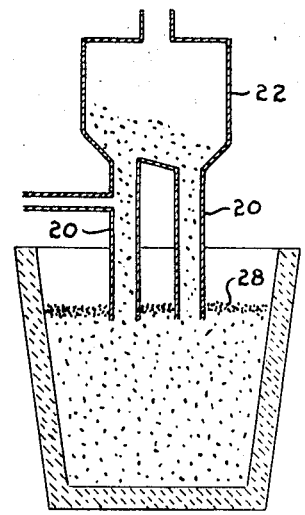
Figure 2:
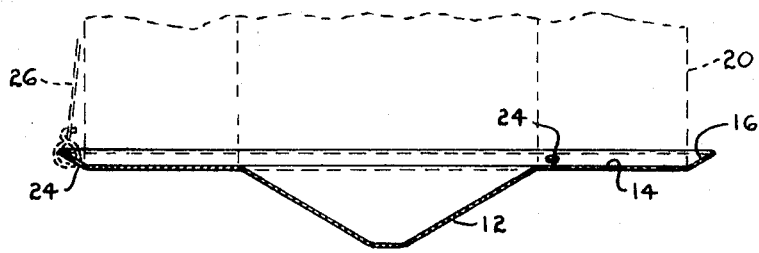
Figure 4:
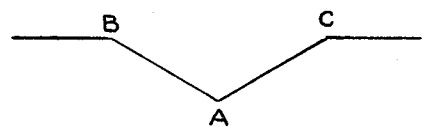
Figure 5:
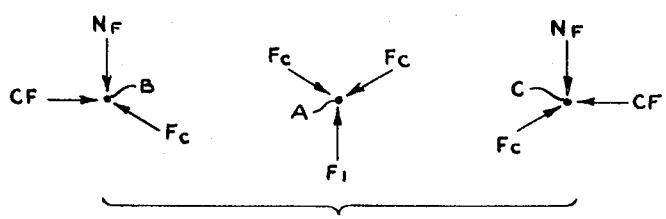

United States Patent

[11] 3,592,457

| [72] | Inventor | Horace Freeman |
| | | Cap de la Madeleine, Quebec, Canada |
| [21] | Appl. No. | 777,369 |
| [22] | Filed | Nov. 20, 1968 |
| [45] | Patented | July 13, 1971 |
| [73] | Assignee | Freeman Corporation |
| | | Cap-de-La-Madeleine, Canada |

[54] PROCESS AND COMPOSITION FOR SEALING AND DISCHARGING METALLURGICAL FURNACES AND OTHER VESSELS
4 Claims, 1 Drawing Fig.

| [52] | U.S. Cl. | 266/42 |
| [51] | Int. Cl. | C21b 7/12 |
| [50] | Field of Search | 75/50, 61, 65, 41, 27; 266/42, 38 |

[56] References Cited
UNITED STATES PATENTS

| 2,563,131 | 8/1951 | Old | 266/42 |
| 3,201,225 | 8/1965 | Haynes | 75/41 X |
| 1,651,445 | 12/1927 | Cushing | 266/42 |
| 1,730,678 | 10/1929 | Newton | 266/42 |
| 2,207,102 | 7/1940 | Nielsen | 266/42 |
| 2,772,176 | 11/1956 | Leitten | 266/42 X |

Primary Examiner—Winston A. Douglas
Assistant Examiner—A. Skapars
Attorney—Alan Swabey ABSTRACT: One aspect of this invention concerns a moldable composition including finely divided, ferro-alloy metallic particles, iron powder, and an inert agent for use in plugging tap holes in furnaces, which composition may be included in an iron pipe for insertion into a tap hole. The invention also concerns a method of removing the contents of metallurgical or similar vessels employing the above compositions by subjecting the tap to a jet or stream of oxygen.

PATENTED JUL 13 1971

3,592,457

INVENTOR.
LOUIS F. MIKLOS
BY Walter Leuca
ATTORNEY

PROCESS AND COMPOSITION FOR SEALING AND DISCHARGING METALLURGICAL FURNACES AND OTHER VESSELS

This invention relates to metallurgical furnaces and other similar vessels.

More particularly, one aspect of this invention relates to a process for sealing and discharging the contents from metallurgical furnaces or similar vessels containing molten metallic products.

In another of its aspects, the invention relates to a composition for sealing a channel or aperture used in removing the molten products from such furnaces or vessels.

In the metallurgical and similar industries, ladles, furnaces or similar vessels are employed in which large quantities of molten metal such as iron, steel, and other metals and accompanying molten fluxes and slags composed of nonmetallic minerals, are produced or held therein at high temperatures.

The removal of the molten products from such vessels is usually accomplished by (1) providing a pouring lip at the top of the vessel and suitable means for tilting the vessel, or alternately (2) by providing one or more tapping holes at or near the bottom of the vessel.

The use of (1) requires special equipment and thus increases operating costs. By (2), the additional costs of the extra equipment are eliminated and the tapping holes may be plugged up by a stopper after the vessel is empty.

The most common, present-day stopper is of a clay type, generally composed of a refractory plastic clay material of high fusing point which is inserted into the tap hole by hand ramming or by a mechanical device such as a clay "gun" or extruder so as to fill the holes and close them tightly against any subsequent head or pressure of molten material within the vessel. The refractory plastic clay material quickly dries and hardens without fusing within the tap hole. When removal of the clay stopper is desired, the normal procedure is to manually chip it away with drill and hammer, or mechanically by means of a drill. In the case of very large furnaces such as blast furnaces producing pig iron, and other nontilting furnaces producing steel or pig iron and slag in large quantities, the opening of the tap manually is exceedingly dangerous owing to the resulting rapid flow of hot molten material. In other cases, such as steel furnaces and furnaces producing slags, which melt only at very high temperature, it is necessary to preheat the tap to a very high temperature to prevent freezing of the first molten material passing therethrough.

In addition to the above, in certain types of metallurgical furnaces, particularly those employed formulating highly refractory (difficult to melt) materials such as titaniferous ores, bauxite, silica and ferro silicon, much of the material, not melted, forms a coating of considerable thickness inside the furnace lining, thus creating a crucible in which the molten material is prevented from attacking and destroying the wall. Thus, when it is necessary to tap the furnace, it is obvious that this solid wall, inside the wall of the furnace, must also be penetrated. Experience has shown that it is difficult at times to penetrate this wall, in line with the tap hole of the furnace wall proper.

One solution to the above may be accomplished by melting out the stopper by means of a lance. A typical lance comprises a long tube of iron or steel through which a flow of high pressure (50 pounds to 200 pounds per square inch) oxygen gas is provided. A combustible metallic powder is suspended in the tube, normally iron powder, which, together with the iron of the end of the lance, will burn and oxidize rapidly when the lance is inserted in the hot tap. This will flux away the stopper material by the very hot and liquid iron oxide which is formed.

However, the above method involves the use of a dispensing device to feed the metallic powder, at a controlled rate, through a flexible hose connecting the dispenser with the lance, and through the lance itself which may be as long as 20 feet or more. The operation of conveying the metallic powder in suspension in a regular quantity, in relation to the equivalent oxygen required for the combustion, becomes very complicated. This is particularly so when the lance is pushed against the material in the tap which results in blocking the gas flow thereby causing the powder to fall out of suspension and block the flow of oxygen in the lance and its connections. The result is an erratic flow of powder and oxygen with variations in the rate and temperature of iron oxide formed in the tap, with spasmodic fluxing away of the stopper and delayed opening of the tap. Moreover, in burning away the material contained in the tap hole of the above types of furnaces, the lance used often becomes overheated and is actually burned away before completion of the opening is attained. Quite often, due to the excess of time and temperatures, required to penetrate the material in the tap hole, the inner hole becomes distorted, enlarged and out of line with the hole in the wall, thus bending and distorting the lance and delaying the opening.

In accordance with this invention, applicant has developed compositions suitable for use as a stopper in metallurgical furnaces or similar vessels which overcomes the problems of the prior art. Further, according to a further aspect of this invention, there is provided a method which permits the ready removal of a stopper inserted into the tapping holes. In a still further embodiment of this invention, there is provided a method of opening tap holes in a furnace where there is a coating creating a crucible on the inside of the furnace wall.

The compositions suitable for use according to one aspect of this invention include finely divided combustible metallic particles of high termal and fluxing value compounded with an inert additive agent, such as clay, and metallic iron powder.

The metallic particles suitable for use in the present invention are based mainly on powdered metal alloys of iron with aluminum. In place of part of the aluminum, silicon or a combination of aluminum and silicon may be used. These alloys are preferred for use in applicant's composition because of their highly thermic nature and because they will not ignite or burn when heated to red heat in air, but conversely will ignite and generate heat very rapidly when heated to high red heat in concentrated oxygen.

The ferrous alloy powder preferably contains about equal proportions of iron and the other alloy agents—aluminum, silicon or aluminum and silicon. When silicon is used to replace a portion of the aluminum in the ferrous alloy, it is desirably present in an amount more or less equal to one-half the weight of the aluminum. This ferro-silicon-aluminum alloy has been found to result in a very satisfactory composition since it forms ferrous aluminum silicates which result in very freely fluxed slag.

The ferrous alloy powder should be approximately −100 mesh and may contain 30 percent or more passing through 325 mesh (U.S. standard screen), with an intermediate distribution of sizes.

Applicant's compositions will invariably contain the metallic iron powder, having a high ignition point in air but capable of igniting at a low red heat in a stream of oxygen gas, in an amount sufficient to ignite the ferrous alloy powder, and to provide a considerable addition to the amount of iron oxide formed on combustion of the iron. Thus, once the iron powder ignites, it will rapidly develop a high enough temperature to ignite the refractory alloy particles. The free iron powder therefore provides the means for igniting the more refractory alloy powders as well as supplying, together with the iron content of the alloy powders, a large portion of the heat developed, and a large portion of the fluxing action required.

The metallic iron powder used in applicant's compositions may have a particle size as coarse as −40 mesh. The iron powder is preferably mixed or blended with the ferrous alloy powder to form a mixture containing between about one-third and four-fifths by weight of the free iron powder.

Although the compositions of this invention contain ferrosilicon, ferro-aluminum, or ferro-silicon-aluminum alloys which raise the ignition temperature, these alloys greatly add to the heat evolved and to the fluidity of the oxidized product which will be composed of mixed oxides of iron, aluminum and silicon together with the agents added to the stopper composition. The stopper composition is fluxed by the mixed oxides and silicates formed by the oxidation of the mixture in the composition which will result in the formation of a thin slag. The thin slag will be blown out of the tap by the pressure of the oxygen gas.

According to one embodiment of the method of this invention, a metallurgical furnace or similar vessel may be emptied of its contents by subjecting the tapping holes containing the above-defined composition, to an oxygen gas flow which will ignite the stopper. In regard to a further embodiment of the invention where there is provided a method of opening the tap holes in furnaces where there is a coating creating a crucible on the inside of the furnace wall, at the end of the tapping operation, or prior to the start of the furnace operation—i.e. when the furnace is empty, the entire tap hole—being the hole in the furnace wall and the hole in the lining formed by the crucible, which together must be aligned, may be closed with a length of steel pipe containing applicant's composition, which pipe is a little less than the diameter of the hole and having a length sufficient to penetrate from the outside of the furnace to the inside of the crucible or wall of the solid charge.

A particularly advantageous feature of this invention is that the stopper composition, as described above, will not and cannot ignite at the end of the stopper within the furnace or similar vessels where they are in contact with molten metal, since they contain no oxygen components which would make them self-igniting and thus open the tap when it is not desired to do so. Further, the applicant's composition will not ignite on the open or outside end of the stopper which is exposed to the air, even at a high red heat, until the composition comes into contact with the oxygen gas.

The inert additive agent used in applicant's compositions can be various types of products known in the refractory art. Suitable additives include various types of clays.

Ordinary clay is most readily available and inexpensive. However, its fusing point is sometimes low and therefore highly aluminous clays of a higher melting point are preferable to retain the material in the furnace before tapping. Finely ground calcined magnesite or dolomite may also be used.

The additive agent or binder preferably constitutes from about 5 to about 50 percent of the total weight of the composition. Applicant has found it advantageous where the binder is from about 10 to about 50 percent of the weight of the composition.

If desired, a plasticizing agent may be added to the compositions of this invention. Bentonite clay is preferred for plasticizing applicant's compositions as its particles are readily dispersible on the addition of water and impart plasticity to the usually coarser particles of alumina, magnesite or dolomatic material which may be used. It will be understood to those skilled in the art that other agents suitable for this purpose can also be used, such as powdered pitch which renders the dry mixture plastic when heated.

The plasticizing agent, if used, is desirably incorporated into the composition in an amount from about 2 to about 10 percent by dry weight thereof. Preferred amount of the plasticizing agent is approximately 5 percent by weight of the composition.

The compositions of this invention are admixed with water for use when dry clay is used. The amount of water will normally be within the range of from about 12 to about 20 percent by weight of the composition. Good results have been obtained using water in an amount from about 13 to about 18 percent by weight of the composition.

It will be understood that the degree of plasticity of the compositions may be controlled by the quantity of water, which water will be added to the dry mixtures before use.

In preparing the compositions of this invention, mixtures of a dry metallic iron powder, and the ferrous-alloy powder are first of all prepared. To the dry mixture of metallic components, the required amount of dry additives, such as clay, are then added in. Additionally, there may be added a plasticizing clay of the bentonite type in the desired amount. The water will then be added in the desired proportions.

According to a further embodiment of the composition of this invention, in addition to the water, plasticizing clay, etc., this invention also contemplates that various thermoplastic organic materials may also be used, which are capable of rendering the inventive composition a moldable mass. In the embodiment where the thermoplastic organic material is used, no water is required since the addition of this agent provides a composition which may be readily inserted. To obtain such a composition, it may be required to heat the thermoplastic organic material with the other products of applicant's composition to form a plastic mass before use in a gun or extruder. The thermoplastic organic materials are those which are plastic at low temperatures for a length of time required to plug the tap hole of the furnace or fill the above described steel tube, and capable of being hardened at elevated or higher temperatures. As an example of such thermoplastic organic materials, there may be used powdered coal tar pitch which may be mixed with the alloy metallic particles, in an amount of about 10 to about 20 percent by weight of the composition. Thus, for example, when such a mixture is heated to the softening point of pitch, the mixture becomes a plastic mass which can be pushed into the tap hole, or packed into the steel pipe which is then inserted into the tap hole as described above. Once the mixtures containing the thermoplastic organic materials are in place, they will then carbonize to hold the metal powder intact in the tap hole or steel tube at the higher temperatures involved in such metallurgical operations. In removing the stopper compositions, the residue of the solid carbon content of the thermoplastic organic materials is burned and removed together with the metal oxides formed by the oxygen stream when tapping is effected.

In the embodiment where a steel pipe is employed, the pipe is packed with the metallic composition of this invention, as defined above in either of its forms. The pipe itself is of iron, or steel, but not cast iron, for the reason that cast iron pipe will not burn easily in oxygen.

Due to the low carbon content of the iron of the pipe, and the composition of this invention contained in the steel pipe, its contents will burn fiercely when the furnace is later lanced to discharge its content and, since it is rapidly removed as liquid oxides by the progressive entrance of the oxygen lance, which is cooled by the expanding gas, it is kept straight until the pipe and its content are liquefied by the oxygen and blown out.

The pipes which may be used in this invention, as indicated above, are steel pipes, not cast iron, and will vary in length from a foot to 2 or more feet. Normally, scrap lengths of pipe, such as ordinary black iron pipe will suffice for this purpose. The inside diameter of the pipe may be as small as one inch or even less to as large as three inches or more according to the size and length of the tap hole into which it is placed. The consumption of the iron of the pipe by oxygen lessens the consumption of higher exothermic plastic that would be required to fill the tap without the pipe.

It is to be noted that during the period the furnace is being worked, the pipe and its content remain in place to hold the molten material in the furnace and neither can be removed until faced with the oxygen lance, whereby combustion is rapidly effected resulting in extremely high temperature liquid oxide mixtures of iron, aluminum and silicon which are blown out of the tap thereby releasing the material from within the furnace.

Having thus generally described the invention, reference will now be made to the following example, illustrating a typical composition according to this invention. The specifics of the example are not to be construed as limiting but only representing preferred embodiments.

EXAMPLE

In preparing the following composition, a mixture of the dry metallic iron powder, the ferro-aluminum powder and the ferro-silicon powder are first of all blended in the following amounts.

|  | Parts weight lbs. | B.t.u. content |
|---|---|---|
| Iron powder—100 mesh oxidizing value 3,000 B.t.u./lb. | 75 | 225,000 |
| Ferro-aluminum 50/50 oxidizing value 7,500 B.t.u./lb. | 100 | 750,000 |
| Ferro-silicon powder 80/20 oxidizing value 4,870 B.t.u./lb. | 100 | 487,000 |
|  | 275 | 1,462,000 |

NOTE: 5,316 B.t.u.'s per pound.

To the above dry mixture, an equal amount by weight of dry aluminous clay of high melting point, e.g. finely crushed fireclay or China clay is then added. In place of the fireclay or China clay, other products such as fire refractory material e.g. burnt magnesite or dolomite may be used.

The amount of the added clay will be determined by the operator for his particular requirements. Thus for extremely rapid fluxing of the stopper he may use as little as ten percent of the clay forming refractory and for slower rates he may use in excess of this amount up to a limit of 100 percent on the basis of the weight of the metallic mixture.

To the whole mixture before the addition of water, there may be added a plasticizing clay of the bentonite type in an amount of 5 percent more or less of the whole by weight, which improves the flow of the mixture when it passes through the gun or extruder into the tap hole or other location.

In practice, water will be added to the above dry mix before use to give the desired plasticity.

The above mixture may then be inserted into a tap hole. The mixture rapidly dries out to a dry product, which is then protected against oxidation by air and heat on the end which is exposed to the atmosphere. Further, the dry mass is protected against fusion on the inside end exposed to the contents of the furnace, in the absence of oxygen content.

The compositions of this invention, however, fire immediately when faced with the oxygen stream, first by the ignition of the iron particles, followed rapidly by combustion of the ferro-alloy component with consequent rapid melting out of the stopper upon which the lance is withdrawn and the oxygen flow is stopped. In normal practice a stopper of 4-inch diameter and 12 inches long is melted by the application of 50 to 60 cubic feet of oxygen in approximately 3 minutes. Smaller stoppers are removed by the application of 20 cubic feet of oxygen in 1 to 1½ minutes when the stopper is composed of 70 percent metallics and 30 percent clay. The time of removal may vary slightly according to the degree of preheat of the stopper obtained from the heat of the furnace. Thus stoppers with a high metallic content will have the most rapid rate of removal due to higher preheat, greater rate of absorption of oxygen, higher temperature developed and less heat requirement for fusion. It is to be noted that most of the heat of reaction is found in the liquid products (oxides, silicates) formed since no gases are formed and no heat lost due to that cause.

It is to be noted also that since no combustion of powder occurs in the end of the lance, this end is consumed only slowly by the oxygen, hence long lance life.

In order to describe a further embodiment of this invention, reference is made to the attached drawing, in which the FIGURE illustrates an end elevation of a furnace used for producing high temperature ferro-alloys, steel, fused alumina, and the like, and shows the maintenance of the tap hole through the furnace wall and solidified lining (crucible).

In the drawing, reference numeral 10 indicates the furnace wall mounted on a pair of I-beams 16 which rest on a floor surface. Reference numeral 12 indicates a carbon electrode such as is used in these furnaces (normally three are used). The furnace contains a charge 11, and the molten material produced by the furnace is indicated by reference numeral 15. A portion of the material charged into the furnace, after melting, solidifies against the sidewalls of the furnace as indicated by reference numeral 14. This forms a "crucible" on the furnace walls.

To empty such furnaces, a tap hole is normally drilled in the furnace wall 10 where the molten product is located, and is then drawn off to a runner 24, which feeds the product to a ladle.

In accordance with this invention, such tap holes, extending through the furnace wall 10 and through the crucible, are provided with a length of iron pipe 18 containing the thermochemical metal composition of applicant's development, as more clearly defined in the original disclosure. This length of iron pipe 18 containing the composition 20 is inserted in the furnace prior to a startup operation, or when the furnace is emptied of a previous charge. Once the material 20 is hardened by the residual heat in the tap hole, the furnace can then be operated until it is time to withdraw the molten product 15.

To withdraw the product 15, the iron pipe 18 containing the charge 20 is contacted with a source of oxygen, provided by the lance 22 supplied via line 26 to ignite it and to fuse the composition and at the same time, to remove the composition from the tap hole thereby permitting the contents of the furnace to be removed.

When using organic materials as the binder, water is not needed.

I claim:

1. A process for removing the contents of a metallurgical furnace or similar vessel, comprising removing a stopper contained in said furnace which consists of a finely divided combustible metallic particle mixture, said metallic particle mixture being selected from the group consisting of at least one ferro-aluminum alloy, a ferro-silicon alloy and a ferro-aluminum-silicon alloy, iron powder and an inert refractory clay additive, by contacting said stopper with a source of pressurized oxygen to thereby ignite and fuse the stopper, blow it out of the tap by the oxygen pressure and thereby permit the contents of the vessel to be removed.

2. The process of claim 1, wherein the metallic particles have a particle size of about —100 mesh with at least 30 percent capable of passing through 325 mesh, and wherein the stopper is contacted with a jet or stream of oxygen to thereby ignite and remove the stopper.

3. The process of claim 1, wherein said stopper is contained in a steel jacket.

4. The process of claim 1 wherein the stopper contains a thermoplastic organic agent in place of said clay additive.

UNITED STATES PATENT OFFICE
CERTIFICATE OF CORRECTION

Patent No. 3,592,457                    Dated July 13, 1971

Inventor(s)   Horace Freeman

It is certified that error appears in the above-identified patent and that said Letters Patent are hereby corrected as shown below:

Cancel the present sheet of drawing and substitute the drawing shown below:

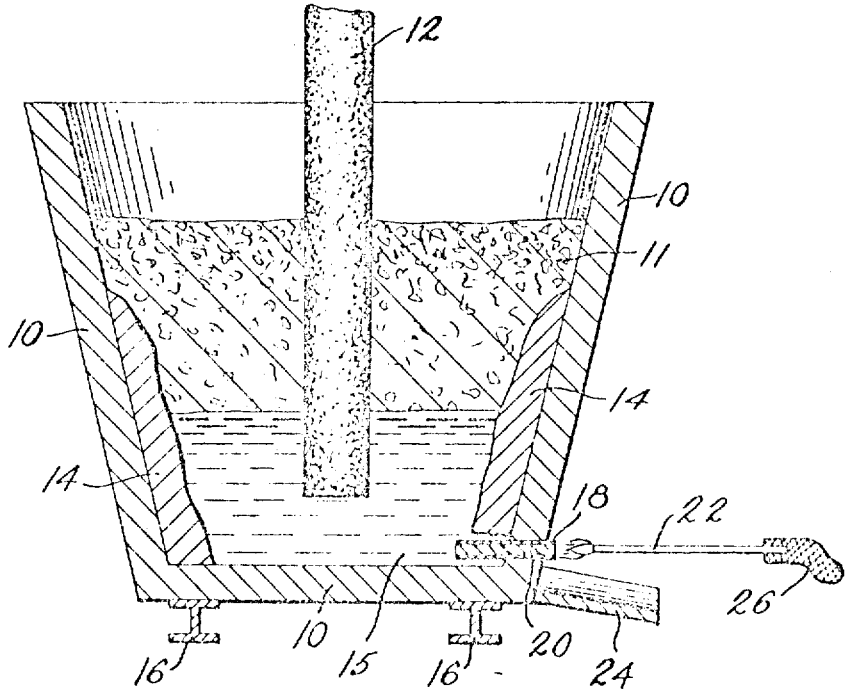

Signed and sealed this 9th day of May 1972.

(SEAL)
Attest:

EDWARD M. FLETCHER, JR.                 ROBERT GOTTSCHALK
Attesting Officer                       Commissioner of Patents